(12) United States Patent
Bechler

(10) Patent No.: US 9,478,335 B2
(45) Date of Patent: Oct. 25, 2016

(54) COIL DEVICE, AND METHOD FOR PRODUCING SAME

(75) Inventor: Matthias Bechler, Singen-Friedingen (DE)

(73) Assignee: ETO Magnetic GmbH, Stockach (DE)

( * ) Notice: Subject to any disclaimer, the term of this patent is extended or adjusted under 35 U.S.C. 154(b) by 0 days.

(21) Appl. No.: 13/984,166

(22) PCT Filed: Feb. 9, 2012

(86) PCT No.: PCT/EP2012/052188
§ 371 (c)(1),
(2), (4) Date: Aug. 7, 2013

(87) PCT Pub. No.: WO2012/107515
PCT Pub. Date: Aug. 16, 2012

(65) Prior Publication Data
US 2013/0314191 A1  Nov. 28, 2013

(30) Foreign Application Priority Data
Feb. 9, 2011 (DE) .................. 10 2011 010 777

(51) Int. Cl.
| H01F 5/04 | (2006.01) |
| B23K 35/00 | (2006.01) |
| H01F 41/10 | (2006.01) |
| H01F 41/06 | (2016.01) |
| H01F 7/06 | (2006.01) |

(52) U.S. Cl.
CPC .............. *H01F 5/04* (2013.01); *B23K 35/00* (2013.01); *H01F 41/0612* (2013.01); *H01F 41/10* (2013.01); *H01F 2007/062* (2013.01); *Y10T 29/49071* (2015.01)

(58) Field of Classification Search
CPC .......... H01F 5/04; H01F 27/29; H01F 41/10; H01F 2007/062
USPC .......................................... 336/192
See application file for complete search history.

(56) References Cited

U.S. PATENT DOCUMENTS

| 4,672,349 | A | * | 6/1987 | Bradt ........................... 336/192 |
| 7,471,179 | B2 | | 12/2008 | Hatakeyama et al. |
| 7,570,143 | B2 | | 8/2009 | Adunka et al. |
| 8,228,150 | B2 | | 7/2012 | Golz et al. |

(Continued)

FOREIGN PATENT DOCUMENTS

| CN | 101573769 A | 11/2009 |
| CN | 203260445 U | 10/2013 |

(Continued)

OTHER PUBLICATIONS

Chinese Office Action for 201280008430.7, dated Jun. 3, 2015.

*Primary Examiner* — Ramon M Barrera
(74) *Attorney, Agent, or Firm* — Bachman & LaPointe, PC

(57) ABSTRACT

A coil device (1) comprising a coil winding (3) for an electromagnetic actuating device or an electromagnetic sensor, having a winding wire (11) which has an insulating element and which is ran to at least one contacting element (5, 15) that is designed as a metal part, in particular a stamped part, and a stripped section of the winding wire is received at the contacting element between the contacting element (5, 15) and a metal cover (6) and fused to the contacting element (5, 15). A recess (8) is impressed into the contacting element (5, 15), the recess receiving the winding wire (11) in some sections and being designed with a winding wire inlet geometry.

4 Claims, 8 Drawing Sheets

(56) References Cited

U.S. PATENT DOCUMENTS

2012/0006794 A1  1/2012  Murakami et al.
2013/0127572 A1  5/2013  Golz

FOREIGN PATENT DOCUMENTS

| | | |
|---|---|---|
| DE | 3838825 A1 | 5/1990 |
| DE | 19528273 C1 | 3/1997 |
| DE | 202005016789 U1 | 3/2007 |
| DE | 202006011904 U1 | 12/2007 |
| DE | 102007030057 A1 | 1/2008 |
| DE | 202010009713 U1 | 11/2011 |
| EP | 1833062 B1 | 12/2008 |
| JP | 61179513 A | 8/1986 |
| JP | 7178567 A | 7/1995 |
| JP | 2004103862 A | 4/2004 |
| WO | 2010110046 A1 | 9/2010 |

* cited by examiner

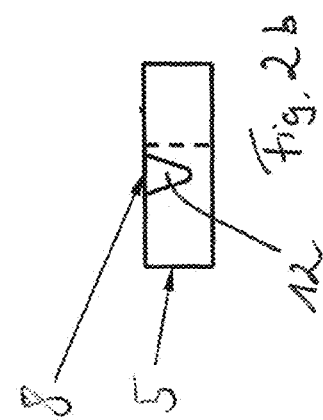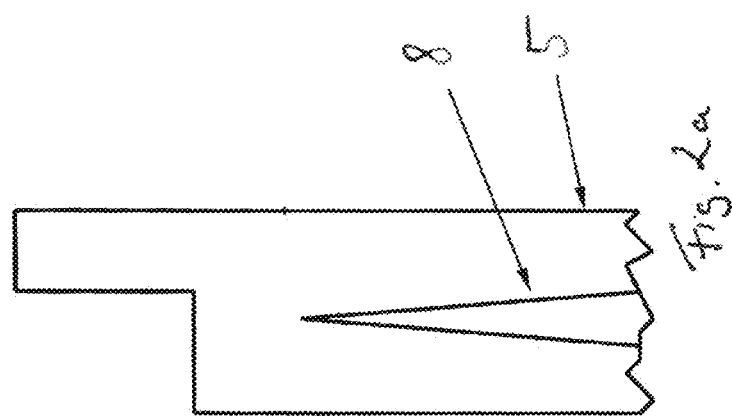

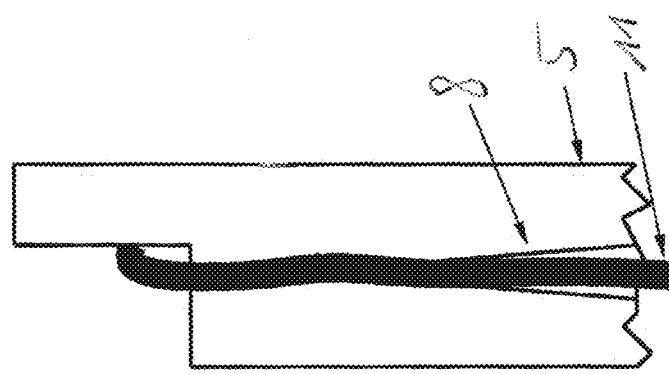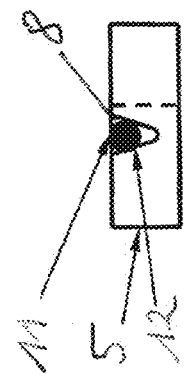

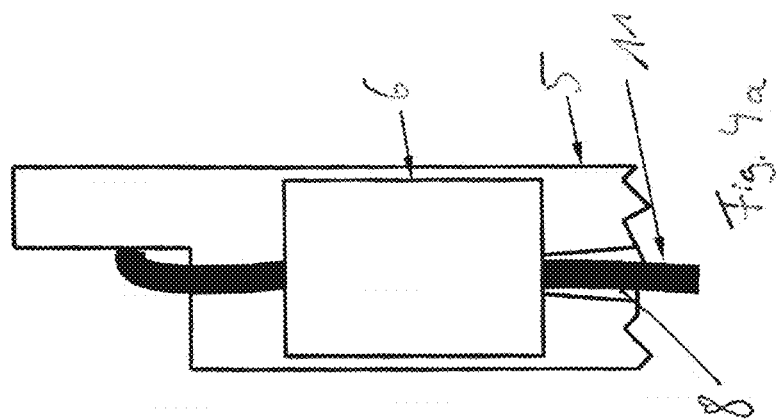
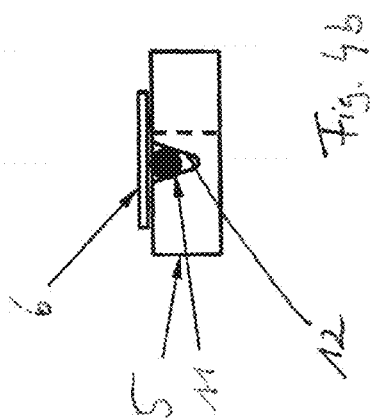

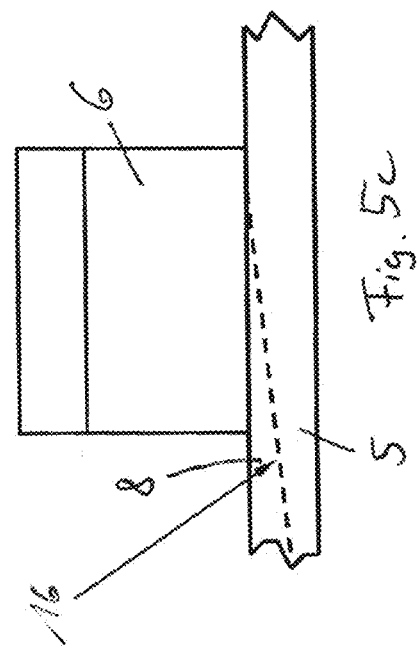
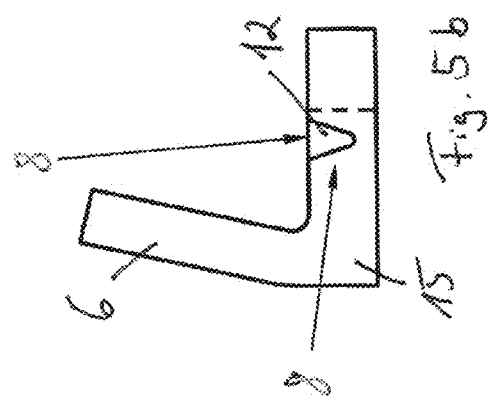
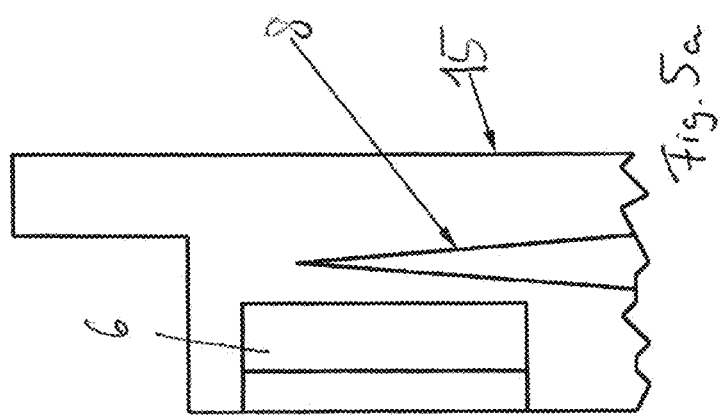

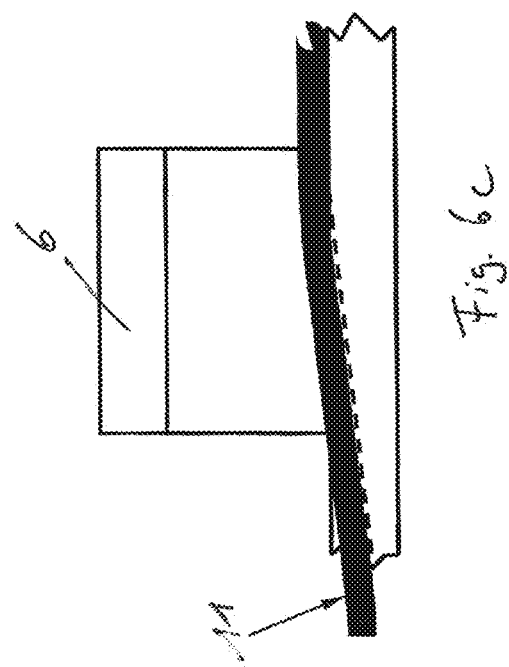
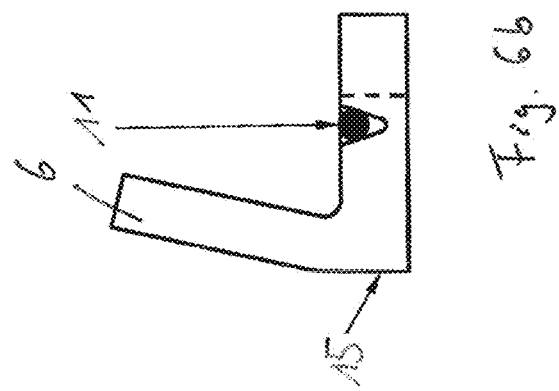
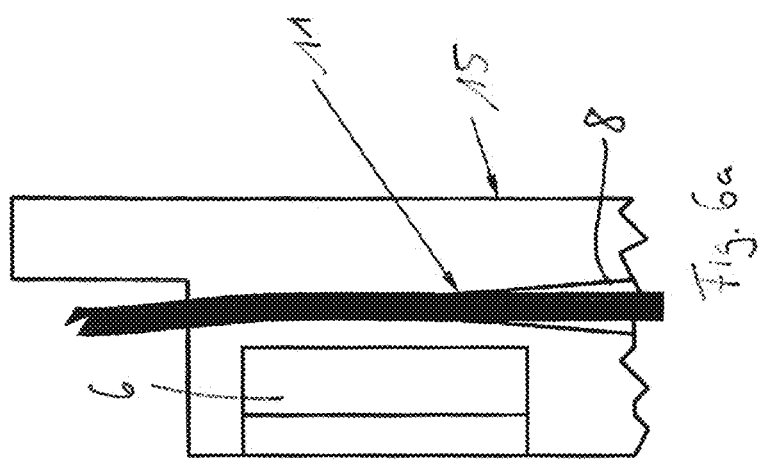

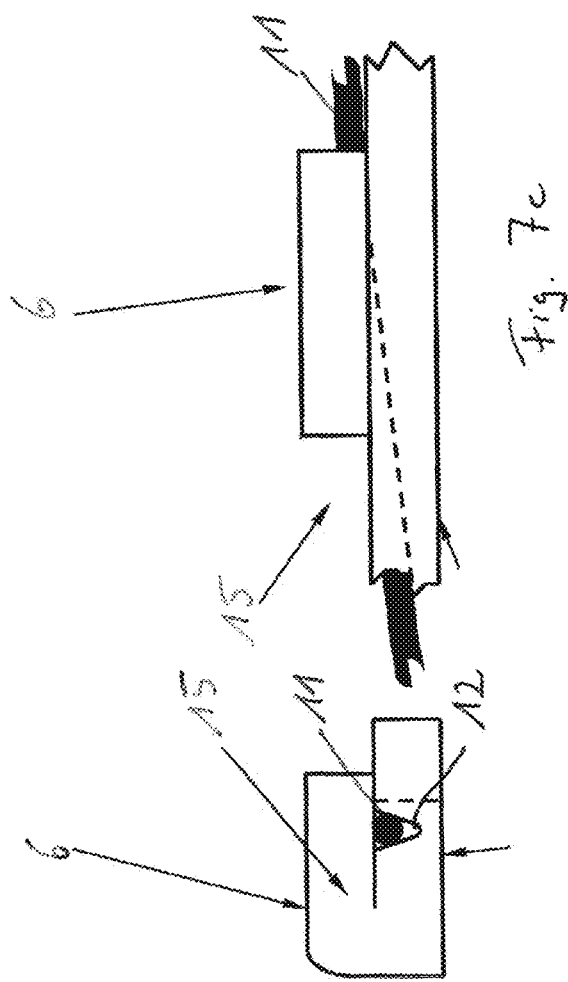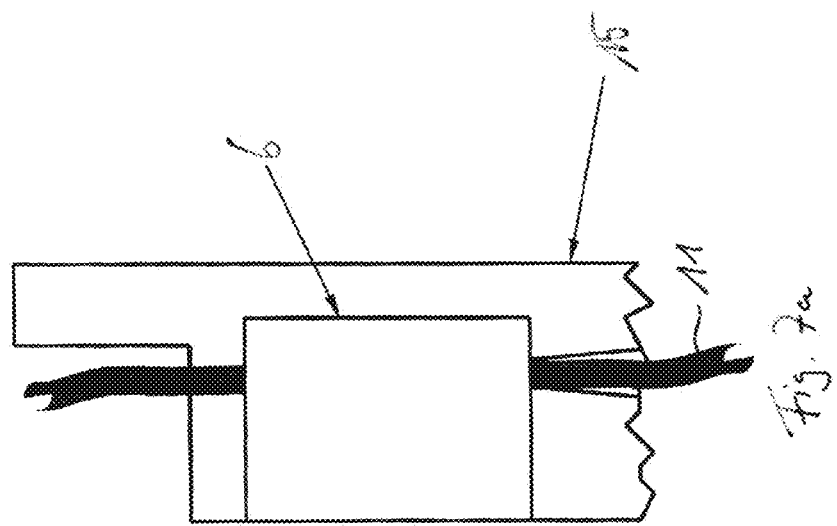

COIL DEVICE, AND METHOD FOR PRODUCING SAME

BACKGROUND OF THE INVENTION

The invention relates to a coil device with a coil winding for an electromagnetic actuating device or an electromagnetic sensor, for example an ABS sensor in a motor vehicle, having a wire provided with an insulating, which wire is led to at least one contacting element that is designed as a metal stamped part, and a stripped section, in particular an end section, of the winding wire is received at said contacting element between the contacting element and a metal cover and fused to the contacting element.

The invention further relates to an electromagnetic actuating device or an electromagnetic sensor with a coil winding and a production method for producing the coil device.

From DE 20 2006 011 904 U1 an electromagnetic actuating device is known, which has a fixed coil device for adjusting an elongated actuator when current is applied. The coil device comprises here a plastic carrier with a coil winding arranged thereon, wherein the ends of the winding wire are each run to a contacting element and are fused thereto. Usually a so-called plate welding method (a resistance welding method) is used for fusing, in which the winding wire end is received between the contacting element and a metal plate and then, by application of the metal plate with a current impulse, is fused to the contacting element. During the welding process, at the same time a fusing of the metal plate to the contacting element also takes place.

In the previously described resistance welding method which is known per se, the electrode, which is clamped in a welding head, presses the metal plate with a defined force onto the copper wire which is applied onto the contacting element and in so doing impresses a recess (wire inlet) into the plate, which recess receives the winding wire end. After reaching the set force, the winding wire is connected by a current pulse with a flat region of the contacting element by fusing and is, in so doing, stripped of insulation. So that, before the application of the metal plate with a current pulse, the wire inlet can be impressed into the metal plate by the application of force of the metal plate by means of the electrode, a corresponding geometry must be provided in the electrode. This geometry is comparatively liable to wear, which leads to a small service life quantity of the electrodes which come into use. The electrodes must be frequently refinished, wherein for this, in practice, the front face of the electrode must be reset and the geometry must be newly milled in.

In the known method also the quality assurance or respectively checking of the welding plates by means of image processing software after welding is problematic. The three-dimensional, impressed geometry contains differently reflective free-form surfaces. In addition, the plate geometry alters with increasing electrode wear.

In a further, alternative, resistance welding method known from practice, for the materially-connected connection of a coil winding wire with contacting elements, metal plates separate from the contacting element are not fused to the contacting element, but rather a bendable lug, provided laterally on the contacting element, which after bending encloses the winding wire end together with the actual contacting element. In this method, a chamfered electrode is used, i.e. an electrode which has an effective area not running perpendicular to the direction of application of force, in order to impress the bent lug such that an optimized clamping of the winding wire end is ensured, or respectively that a mount for the wire is impressed. In this method also a not insignificant wear of the chamfered front area (effective area) results of the welding electrode which is used, which leads to short lifetimes and a laborious reprocessing of the effective area.

Proceeding from the above-mentioned prior art, the invention is based on the problem of indicating an alternative coil device which is distinguished by being able to be produced simply. In addition, the electrodes coming into use for the production of the coil device are to be distinguished by less wear. As a whole, the production costs are to be reduced. Preferably, an image processing examination of the metal cover, in particular of a metal plate or a metal lug which is less liable to error is to be possible in a simplified manner after welding.

In addition, the object consists in indicating a correspondingly improved, more favourably priced production method ensuring a long service life quantity of the electrodes, for the production of a coil device.

Advantageous further developments of the invention are disclosed hereinbelow. All combinations of at least two of the features disclosed in the description and/or the figures fall within the scope of the invention. To avoid repetitions, features disclosed with regard to the device are also to be deemed as disclosed and claimable with regard to the method. Likewise, features disclosed with regard to the method are to be deemed as disclosed and claimable with regard to the device.

SUMMARY OF THE INVENTION

The invention is based on the idea of providing in the contacting element an impression (inlet geometry), provided in the prior art in the metal cover, directly quasi mirrored for the winding wire, whereby an impressing of such a geometry into the metal cover, in particular a metal plate or a bendable lug constructed in one piece with the contact, can be dispensed with. Hereby, it is possible to fuse in a planar manner with the contacting element a planar metal plate having no inlet geometry, or a metal lug free of inlet geometry, without a form-fitting wire mount, in particular a wire squeezing into a recess extending in the direction of the longitudinal extent of the winding wire having to be dispensed with.

The provision of a corresponding wire mount recess (=winding wire inlet geometry), preferably open on the edge side, in the contacting element brings with it a multitude of advantages. Thus, geometrically substantially more simply designed welding electrodes having a planar effective area on the front fact can be used, because it is no longer necessary, as in the prior art, to mill a corresponding impression geometry into the welding electrode. Hereby, the new manufacture of the welding electrode becomes more favourable. In addition, the reworking is restricted to the resetting of the flat surface. A further essential advantage consists in the increased service life quantity of the electrodes which results from the invention, because the planar electrode front area (effective area) wears substantially more slowly than the complex impression geometry which was necessary hitherto. A further essential advantage consists in that the quality of the welded connection over the electrode service life quantity becomes more constant than hitherto, because no wear of an impression geometry is present, but rather each contacting element has an identical recess geometry, which can be produced with a correspondingly more stable stamping tool. Hereby, the process as a whole becomes more stable. In addition, the impressed recess contours in the contact pins are shape- and tool-specific and are hence able to be produced in a less tolerance-affected manner than individually milled electrodes.

Preferably, the opening of the inlet geometry on the edge side is dimensioned with regard to cross-section such that the winding wire cross-section can be, or respectively is, received completely therein, without projecting over the opening geometry on the edge side which open above (perpendicularly to the longitudinal extent of the winding wire).

For the case where a planar contact plate or a planar lug is fused to the contacting element, i.e. a recess geometry in the plate or respectively in the lug is dispensed with, the image processing examination after fusing can be restricted to the location and position of the plate or respectively of the lug; the laborious examination of a recess geometry in the metal cover (metal plate or metal lug) can be dispensed with.

It is most particularly preferred if the cross-section area of the recess is not constant over the longitudinal extent of the recess, but rather decreases in the direction of a (free) winding wire end associated with the contacting element—therefore a tapering recess cross-section geometry is produced, wherein it is preferred if the cross-section is formed in a tapering manner in a trumpet shape. Through the tapering recess geometry a preferably continuously, increasing winding wire squeezing can be achieved in the direction of the winding wire end, whereby the welded connection is produced in a distinctly more robust manner.

As is already indicated in the introduction, it is particularly preferred if owing to the wire inlet recess provided in the contacting element, a wire inlet recess in the metal cover is dispensed with, that therefore at least the lower surface side of the metal cover facing the contacting element is free of impression. It is particularly expedient if as a whole a two-dimensional (except for the necessary thickness extent), i.e. flat metal cover configuration is concerned.

In further development of the invention, provision is advantageously made that the contacting element is secured on a plastic carrier bearing the coil winding, and if required is bent outside the plastic carrier, preferably through at least approximately 90°. Alternatively a variant embodiment without a bent contacting element is also able to be realized.

As already explained in the introduction, the metal cover can be constructed in the form of a metal plate which is separate from the contacting element before fusing, or alternatively it can be constructed in one piece with the contacting element and bent into the position covering the recess.

The invention not only relates to a coil device as such, but also to an electromagnetic actuating device with a coil device constructed according to the concept of the invention, and an electromagnetic sensor with a coil device constructed according to the concept of the invention. In particular, the concern is with an electromagnetic actuating device or an electromagnetic sensor for applications in motor vehicles, for example an ABS sensor. In addition to the coil device, the electromagnetic actuating device preferably comprises a preferably elongated actuator movable by the force of a coil device, supplied with current, in particular provided in a fixed manner. If required, permanent magnet means can be associated thereon for cooperating with a core region. Precisely the use of the invention within an electromagnetic actuating device (and comparable arguments then also apply for a use within an electromagnetic sensor) bring the advantage that the dynamic field provided here loads the connection between winding wire and contacting element in a particular manner and the present invention here is particularly durable, secure with regard to contact, and insusceptible to error: both for instance the movement of an actuator in an electromagnetic actuating device with the (periodic, if applicable) pulse load of the arrangement as a whole which is connected therewith, and also an arrangement of such devices for instance in a typical motor vehicle field of application (whether as adjusting device for internal combustion engine units, or as sensor for the mentioned ABS units), bring regular vibrating, shaking or other influences to this connection between winding wire and contacting element, which within the scope of the invention become outstandingly secure with regard to contact, compared with the prior art.

The invention further relates to the use of a welding electrode for fusing a winding wire of a coil winding of a coil device to a contacting element, into which a recess is introduced extending in the direction of the longitudinal extent of the winding wire, wherein the welding electrode has a flat (plane) effective area for cooperating with an upper side, facing away from the winding wire, of a metal cover, and wherein the effective area (front area) is aligned perpendicularly to the longitudinal extent of the welding electrode and/or perpendicularly to an adjusting direction and hence perpendicularly to a direction of application of force during fusing. An electrode constructed in such a manner can be used when the metal cover is free of a recess impression for the winding wire or respectively when such a recess impression is not to be provided by impressing by means of the welding electrode.

Furthermore, the invention details a method for producing a coil device constructed according to the concept of the invention, wherein in the method a metal cover, in particular a metal plate or a metal lug is acted upon by at least one current pulse, in order to fuse the winding wire and the metal cover to a contacting element. In contrast to the prior art, in the contacting element, which is preferably constructed as a stamped part, preferably as a stamped bent part, a recess is provided by impressing, in order to be able to receive therein in some sections the winding wire of a coil winding, particularly preferably in a clamping manner. This winding wire section is inserted into the recess, serving as wire inlet, whereupon the metal cover is positioned such that it covers the recess, with the winding wire section received therein, at least in some sections, whereupon then the application of the current pulse takes place. The force with which the welding electrode is pressed against the metal cover must merely be sufficient in order to produce a sufficient welding contact and to hold the metal cover in position—the pressing force does not, as in the prior art, have to be of such a high extent that an impressing of the metal cover can be carried out with the electrode.

It is most particularly expedient if the impressing of the recess into the contacting element is carried out in the same machine clamping in which the contacting element is stamped out from a metal sheet. Preferably, the impressing of the recess takes place directly in the same upward and downward movement of a corresponding combined stamping and impressing press.

In particular in order to minimize the volume of the structural space of the coil, the contacting element, which is secured on a plastic carrier for the coil winding before the inserting of the winding wire section, can be bent after fusing in a region outside the plastic carrier of the coil device.

As a discrete invention, at this point an electrode for metal plate welding is to be disclosed, such that this subject matter of the invention, if applicable together with further features of the disclosure, is to be claimable and, if applicable, separable, as a discrete invention. The electrode according to the invention comprises, preferably in its effective area, a suction opening, through which a metal plate which is to be fused is able to be aspirated, in particular with the aim of removing the metal plate by suction from a store by means of the electrode, and positioning and holding it in the welding region. Preferably a suction duct is formed within the electrode, which duct opens out via the outlet opening in the effective area of the electrode, wherein the suction duct is connected or able to be connected to a source of negative pressure. The electrode is preferably distinguished by a flat contact area (effective area) for resting on the preferably likewise flat metal plate.

BRIEF DESCRIPTION OF THE DRAWINGS

Further advantages, features and details of the invention will emerge from the following description of preferred example embodiments and with the aid of the drawings.

FIGS. 2a and 2b: a contacting element for the coil device according to FIG. 1 with an impressed recess, tapering with regard to cross-section (FIG. 2a top view, FIG. 2b front view), FIGS. 3a and 3b: the contacting element according to FIGS. 2a and 2b with winding wire not (yet) stripped of insulation, received in the recess, wherein the winding wire is received completely in the recess with regard to cross-section in the subsequent welding region (FIG. 3a top view, FIG. 3b front view), FIGS. 4 and 4b: the contacting element according to FIGS. 3a and 3b with winding wire received in the recess, onto which wire a metal cover in the form of a substantially two-dimensional plate, separate from the contacting element, is covered, wherein the plate is fused to the contacting element in a subsequent method step, preferably by resistance welding, FIGS. 5a to 5c: an alternative contacting element with integral (formed-on or respectively single-piece) metal lug (metal cover), wherein an elongated recess, tapering with regard to cross-section, is provided in the contacting element for receiving a winding wire (FIG. 5a top view, FIG. 5b front view, FIG. 5c side view), FIGS. 6a to 6c: the contacting element according to FIGS. 5a to 5c with inserted winding wire and not yet bent lug (FIG. 6a top view, FIG. 6c front view, FIG. 6c side view), FIGS. 7a to 7c: the contacting element according to FIGS. 6a to 6c with bent lug covering the winding wire before fusing, in which the lug is acted upon by a current pulse via a welding electrode.

In the Figures, identical elements and elements with an identical function are designated by identical reference numbers.

DETAILED DESCRIPTION

Figure 1:
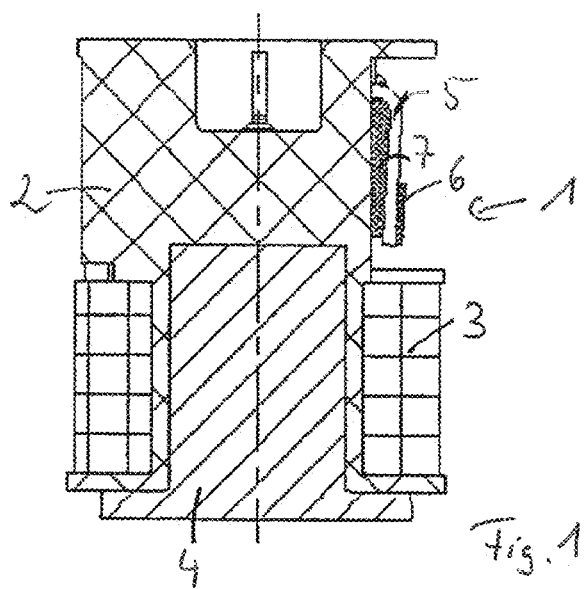
FIG. 1: a coil device of an otherwise not further illustrated electromagnetic actuating device, wherein there is associated with the coil device a core region for cooperating with an actuator, which is not illustrated.

In FIG. 1 a coil device 1 is shown in an illustration in section for an electromagnetic actuating device which is otherwise known per se, as is described in detail for example in DE 20 2006 011 904 U1. The coil device 1 comprises a plastic carrier 2, constructed as an injection moulded part, which carries a coil winding 3 of a winding wire, able to be supplied with current, consisting of a copper wire coated with an insulation lacquer. A magnetically conductive core region 4 for cooperating with an actuator, which is not illustrated, projects into the plastic carrier 2.

Two contacting elements are secured on the plastic carrier 2, on which contacting elements respectively a winding wire is fixed in a contacting manner, wherein in the sectional view according to FIG. 1 neither winding wires nor two contacting elements are illustrated for reasons of clarity, but rather only one of the two contacting elements 5 is illustrated. A metal cover 6, constructed here as a metal plate, is welded securely on the contacting element 5 by resistance welding. The contacting element 5 is bent downwards through approximately 90° in the plane of the drawing outside the plastic carrier 2, and is embedded into a silicone pad 7, in order to damp vibrations during the intended use of the coil insert 1.

In FIGS. 2a and 2b a possible configuration of a contacting element 5, coming into use in a coil device 1 according to FIG. 1 is shown before an optional bending. It can be seen that an elongated recess 8 to receive a winding wire section (stripped of insulation by the fusing process) is introduced into the metal contacting element 5 which is preferably produced by stamping. The recess 8 extends here in the direction of the longitudinal extent of the winding wire section associated with it. It can be seen that the recess is run up to an edge region of the contacting element 5 and hence is constructed as a wire inlet. It can further be seen that the width aligned transversely to the longitudinal extent of the recess 8 and the depth extent of the recess 8, extending away from the subsequent metal cover, decreases in the direction of its longitudinal extent towards the respective wire end, which is not illustrated. The recess cross-section of the recess 8 therefore tapers in the direction of the winding wire end and, in the example embodiment which is shown, in the direction of the free end of the contacting element.

The recess 8 is bordered in some sections by a planar support region for the metal cover.

A winding wire 11 is inserted into the contacting element 5, which is constructed preferably as a stamped/impressed part, more precisely into the recess 8, for producing the welded connection. Thereupon, a metal section, in the example embodiment which is shown (cf. FIGS. 4a to 4b) a metal plate, is applied onto the contacting element 5 and pressed with an electrode against the contacting element with covering of the recess 8 with section of winding wire received therein, and is acted upon by at least one current pulse to produce the welded connection. The planar metal plate lies here on the planar support region of the contacting element. Preferably, the metal plate is aspirated for positioning and holding by the welding electrode, which has a suction opening for this purpose.

In FIGS. 3a and 3b the contacting element 5 is shown after a next method step, in which a winding wire 11 was inserted into the recess. In the example embodiment which is shown, and generally preferred such that it opens into an opening 12 on the edge side and then extends in axial direction beyond the recess 8. It is particularly preferred if the winding wire 11 before insertion into the recess 8 is not yet stripped of insulation in the region received in the recess 8—preferably the stripping of insulation takes place through the subsequent fusing step.

In FIG. 3b it can be seen that the winding wire 11 at least in some sections is received fully in the recess, i.e. does not project over it at least in some sections. Preferably, the cross-sectional area of the recess and that of the winding wire 11 are coordinated with one another such that at the latest during the subsequent pressing of the winding wire with a metal cover, the winding wire 11 is received completely in the recess 8 in the support region of the metal cover (subsequent welding region).

In FIGS. 4a and 4b the contacting element 5 is shown with the metal cover 6 situated thereon, which in the example embodiment which is shown is constructed as a metal plate. The winding wire 11 is covered here by the metal cover 6. As can be seen in particular from FIG. 4b, the winding wire opens into the opening 12 on the edge side of the recess 8 which is open on the edge side, and is received in a sandwich-like manner between the substantially two-dimensional metal plate (metal cover) 6 which is flat on both surface sides, and the contacting element 5. The metal cover 6 is configured free of recess impression and can be fused to the contacting element 5 for final fixing of the winding wire 11 by means of a welding electrode 13, which is illustrated only diagrammatically in FIGS. 8 and 9, without impression geometry.

Figure 8:
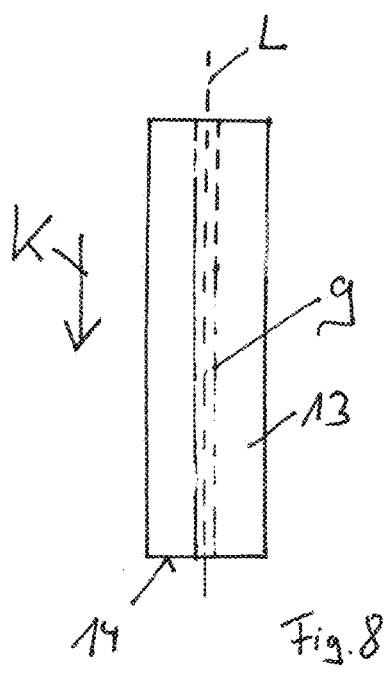
FIG. 8: a highly diagrammatic side view of a welding electrode for fusing a winding wire to a contacting element.
Figure 9:
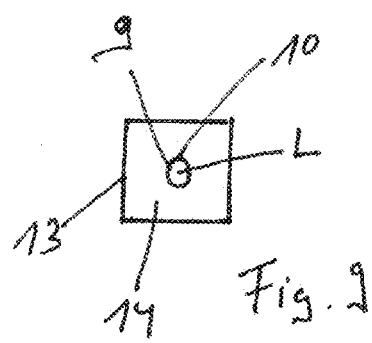
FIG. 9: the welding electrode according to FIG. 8 in a view onto the effective area for contacting the metal cover.

As can be seen from FIGS. 8 and 9, the welding electrode 13 has a flat effective area 14 for cooperating with the surface side of the metal cover 6 shown in FIG. 8. The effective area 14 extends perpendicularly to the longitudinal centre axis L of the welding electrode 13 and perpendicularly to the direction of application of force K, i.e. the adjusting direction in which the welding electrode 13 is delivered to the metal cover 6 for fusing. The effective area 14 is configured free of impression contour, which is possible only in that the contacting element 5 has a recess to receive a winding wire section. As can be seen from FIGS. 8 and 9, in a preferred variant embodiment a suction duct 9 is constructed in the welding electrode 13, which is connectable or respectively connected to a source of negative pressure, which is not illustrated. The suction duct 9 opens in the effective area 14 as a suction opening 10 and serves for aspirating a metal plate, which if required can be removed from a store by means of the welding electrode and can be transported to the contacting element 15 and positioned.

In FIGS. 5a to 5c an alternative embodiment of a contacting element 15 is shown in different views. In contrast to the contacting element 15 which was previously explained in detail, this comprises an integral metal lug as metal cover 6, which is able to be bent around an axis, not shown in the drawings, in order to cover in this bent state a winding wire received in a recess 8, or respectively in order to be fused in this covering state to the region of the contacting element 15 around the recess by means of a welding electrode, in particular a welding electrode 13 shown in FIGS. 8 and 9.

In the example embodiment which is shown, the contour of the recess 8 corresponds to the preceding example embodiment. In this respect, reference is to be made to the above figure description.

It can be seen from the side view according to FIG. 5c that the recess base 16 of the recess 8 rises in a direction oriented away from the opening 12—in other words, the depth of the recess 8 decreases in the direction away from the opening 12, linearly in the example embodiment.

In FIGS. 6a to 6c the contacting element 15 according to FIGS. 5a to 5c is shown with winding wire 11 received in the recess 8. In the method step which is shown, this winding wire is not yet stripped of insulation before the actual fusing step in the subsequent welding region, because the stripping of insulation is realized by heating during fusing. In a method step shows with respect to the situation according to FIGS. 6a to 6c, the integral metal cover 6 (lug) is bent and namely around an axis extending in the direction of the longitudinal extent of the winding wire.

This bent state is illustrated in FIGS. 7a to 7c. In a step following this bending step, the metal cover 6 is fused to the contacting element 15, more precisely to the region of the contacting element 15 around the recess 8, in which a welding electrode 13, shown by way of example in FIGS. 8 and 9, is applied onto the upper side of the metal cover 6 shown in FIG. 7a, and is supplied with current.

The invention claimed is:

1. A coil device comprising a coil winding having an insulated winding wire which is led to at least one contacting element wherein a stripped section of the winding wire is received at the contacting element between the contacting element and a metal cover and is fused to the contacting element, the contacting element has a recess, said recess receives the winding wire sectionally and being designed with a winding wire inlet geometry, the metal cover has a lower surface side free of impression, facing the winding wire stripped section received in the recess facing away from the winding wire section, the recess has a cross section, wherein the cross section is tapered in a direction to an end of the winding wire associated with the contacting element.

2. The coil device according to claim 1, wherein the contacting element is secured on a plastic carrier carrying the coil winding, and is bent outside the plastic carrier through up to 90°.

3. The coil device according to claim 1, wherein the metal cover is a metal plate separate from the contacting element before fusing and is bent into the position covering the recess.

4. An electromagnet actuating device comprising a coil device comprising a coil winding having an insulated winding wire which is led to at least one contacting element wherein a stripped section of the winding wire is received at the contacting element between the contacting element and a metal cover and is fused to the contacting element, the contacting element has a recess, said recess receives the winding wire sectionally and being designed with a winding wire inlet geometry, the recess has a cross section, wherein the cross section is tapered in a direction to an end of the winding wire associated with the contacting element.

* * * * *